(No Model.) 2 Sheets—Sheet 2.
K. HOPKINS.
PROCESS OF AND APPARATUS FOR HULLING AND COOKING CEREALS.
No. 563,860. Patented July 14, 1896.

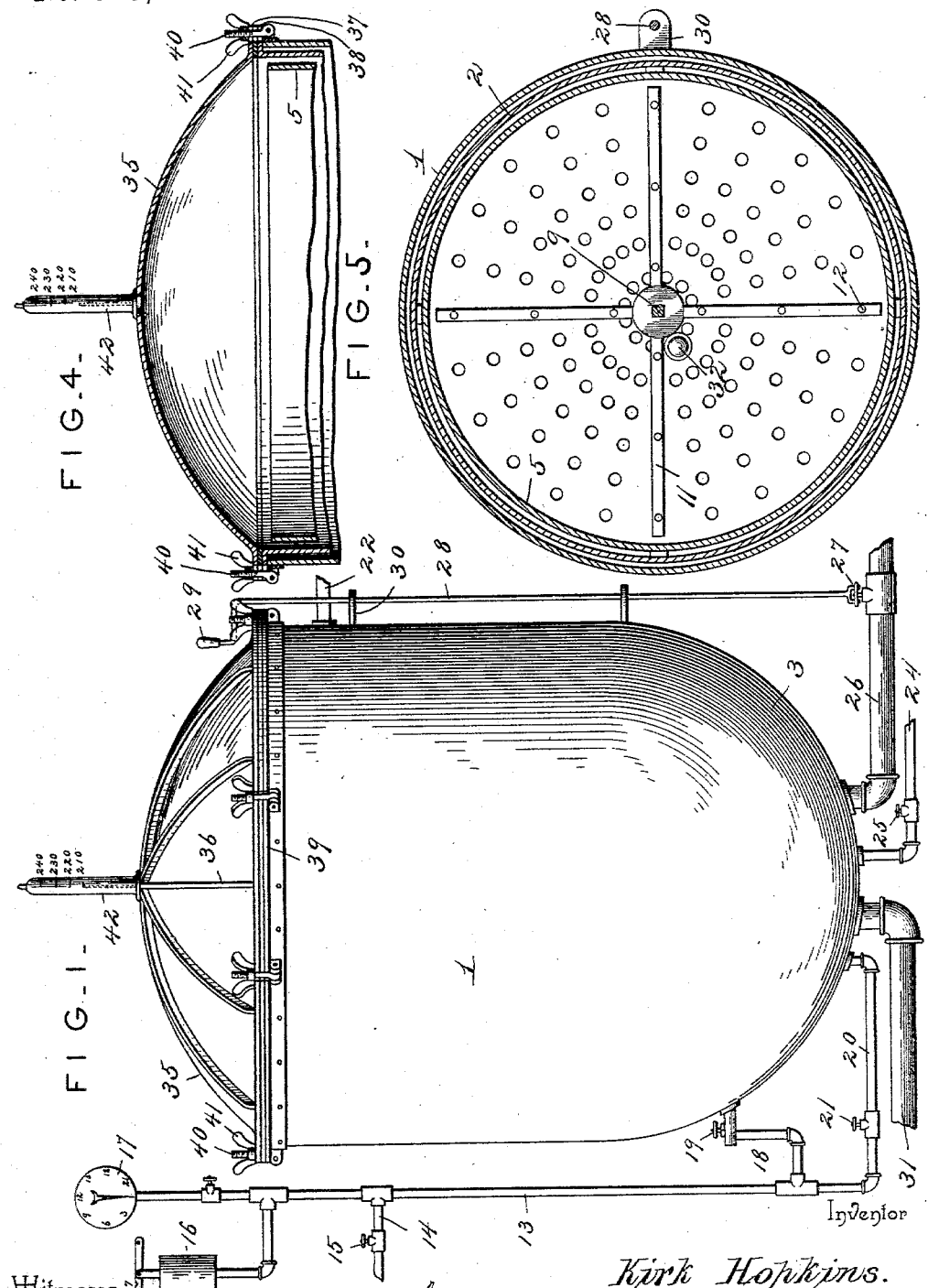

FIG. 3.

FIG. 2.

Witnesses
Harry L. Amer.
V. B. Hillyard.

Inventor
Kirk Hopkins.
By his Attorneys,
C. A. Snow & Co.

UNITED STATES PATENT OFFICE

KIRK HOPKINS, OF SPRINGVILLE, NEW YORK, ASSIGNOR TO THE WESTERN NEW YORK PRESERVING AND MANUFACTURING COMPANY, OF SAME PLACE.

PROCESS OF AND APPARATUS FOR HULLING AND COOKING CEREALS.

SPECIFICATION forming part of Letters Patent No. 563,860, dated July 14, 1896.

Application filed December 21, 1895. Serial No. 572,925. (No model.)

*To all whom it may concern:*

Be it known that I, KIRK HOPKINS, a citizen of the United States, residing at Springville, in the county of Erie and State of New York, have invented a new and useful Process of and Apparatus for Hulling and Cooking Cereals, of which the following is a specification.

The primary object of the present invention is to devise a novel process or method for preparing and cooking cereals in bulk, practically and commercially, and enabling them to be placed upon the market in such a shape and at such a cost as to make them desirable and to create a demand therefor.

A principal feature of the invention is to obviate the handling and transferring of the cereal being treated from one vessel to another, thereby reducing the cost of treating the same and reducing it to a marketable and edible form.

The gist of the invention resides in treating the cereal in a single vessel or caldron and subjecting it to a series of consecutive steps, whereby the hulls and eyes are loosened, removed from the kernel, and carried off from the vessel or caldron, and the cereal washed and finally cooked and drawn off into suitable cans, jars, or packages, and sealed therein for market.

Various other objects and advantages are sought to be attained and will appear as the nature of the invention is better understood; and to this end the improvement consists of the novel features which hereinafter will be more fully described, illustrated, and finally claimed.

Inasmuch as an apparatus or mechanism is essential to carrying out the spirit of the invention, a preferred form is shown, but it will be understood that the same is susceptible of various changes in the form, proportion, and minor details of construction without departing from the principle or sacrificing any of the advantages thereof; and to a full understanding of the invention reference is to be had to the following description and the accompanying drawings, in which—

Figure 1 is a side elevation of a vessel or caldron for attaining the end of the invention and having the cover secured thereon. Fig. 2 is a vertical central section thereof, the cover being removed. Fig. 3 is a detail view of the stirrer or agitator. Fig. 4 is a detail view of the upper portion of the vessel or caldron, showing the relative disposition of the cover, the parts being in section. Fig. 5 is a plan section on the line X X of Fig. 2.

Like numerals of reference denote similar and corresponding parts in all the figures of the drawings.

The vessel or caldron 1 is of the jacket type, that is, it is composed of an inner shell 2 and an outer shell 3, between which is formed a steam-space 4, the two shells being connected at their upper ends in such a manner as to close the steam-space 4 at its upper end. A receptacle 5 is located within the upper portion of the vessel or caldron and is sustained upon bracket-supports 6, extending inward from the shell 2, and is provided at its lower end with an inner flange 7, upon which rests a perforate plate 8, forming a bottom to the receptacle 5, and what may be termed a "false bottom" for the vessel or caldron, since it supports the cereal to be treated at a distance above the bottom proper of the said vessel or caldron.

A stirrer or agitator is provided to operate in the vessel, and, as shown, consists of a vertical shaft 9, journaled at its lower end in a step 10, located centrally and at the lowest point of the shell 2, and radially-disposed arms 11, having pendent beaters 12, which travel through the mass of cereal and remove and dislodge the hulls therefrom. The agitator is rotated either by manual or other power, so as to attain the desired result.

The live-steam pipe 13 is connected by means of a branch-pipe 14 with any suitable steam-generator, and the branch 14 has a valve 15, by means of which the steam supply can be controlled or cut off from the pipe 13 when desired. A safety-valve 16 of any reliable make is connected with the pipe 13 and is set so as to prevent injury to the apparatus when the latter is in operation. An indicator or gage 17 of any pattern or make is coupled to the pipe 13, so that the pressure of steam can be determined and observed at any and all times, which is essential to the successful carrying out of the invention. A branch pipe 18, having valve 19, connects the steam-pipe 13 with the interior of the vessel or caldron, and a corresponding branch pipe 20, having valve 21, connects the pipe 13 with the steam-space 4, and by means of these two pipes 18 and 20 steam is supplied to the interior of the vessel and to the inclosed steam-space as required. An exhaust-pipe 22, having valve 23, communicates with the upper portion of the vessel or caldron and carries off the spent steam to a convenient point of discharge. A similar exhaust-pipe 24, having valve 25, communicates with the lower portion of the steam-space 4 and performs the same office as the pipe 22, and in addition carries off the water of condensation, which would otherwise accumulate in the steam-space 4 and prevent the free circulation of the steam therein.

A waste-pipe 26, having valve 27, leads into the vessel or caldron and communicates with the bottom thereof, and its purpose is to carry off the hulls and eyes to a convenient point of deposit, the valve 27 being operated by means of a rod 28, having a crank 29 at its upper end, said rod being mounted in lugs or projections 30, extending from the side of the vessel. A pipe 31 extends through the lower portion of the vessel or caldron and connects at its upper end with the perforate plate or bottom 8, and is closed by a ball-valve 32, which normally is retained in place by the pressure of the water and by gravity, and which is removed, when it is required to uncover or open the pipe 31, by means of a rod or other instrument in any convenient manner. This pipe 31 is for conveying the cooked and prepared cereal to the cans, jars, or packages into which it is filled for the market. The pipes 31 and 26 are sufficiently large to attain the desired end without choking or clogging.

A pipe 33, extending from a bin or other source of grain supply, terminates above the vessel or caldron and supplies the latter with the grain or cereal to be treated. A pipe 34 terminates over the vessel and has its source in a boiler of suitable construction, so as to supply scalding water to the vessel or caldron.

A cover 35 of suitable formation closes the upper end of the vessel and is preferably dome-shaped, and is strengthened by ribs 36, and is formed at intervals in its edge with slots 37, which coincide with corresponding slots 38 in the outer flange 39 at the upper end of the vessel or caldron, and which slots receive the pivoted clamp-bolts 40, having thumb-nuts 41, by means of which the cover is clamped and securely held upon the outer flange 39. A thermometer 42 of reliable make is attached to the cover 35 and is intended to indicate the temperature, so that the attendant may be guided by its readings in the proper manipulation of the several valves controlling the admission and exhaust of the steam.

It is to be understood that the apparatus herein shown, while preferred, is simply a convenient means for carrying into effect the process or method which is the gist of the present invention, and so far as the method is concerned it is obvious that the same can be effected by an apparatus and construction entirely different from that herein illustrated. Therefore the mechanism illustrated is subordinate to the soul of the invention, which is the method, and is illustrated to show one means of attaining the desired end.

The cereal to be cooked and otherwise treated is placed in the vessel or caldron and is subjected to a bath of lye, and to facilitate the loosening of the hulls steam is admitted into the vessel and the steam-space 4, thereby bringing and maintaining the bath of lye at a scalding temperature. As soon as the hulls are sufficiently loosened the agitator or stirrer is operated, thereby dislodging and removing the hulls, and at the same time a stream of scalding water is admitted into the vessel by means of the pipe 34, and the pipe 26 is opened so as to carry off the loosened hulls, which latter are carried through the openings in the perforate plate or bottom 8 by the combined action of the pressure from above and the suction from below. This step thoroughly washes and cleanses the cereal and puts it in condition for cooking. The pipe 26 is now closed and the vessel filled about three-fourths full of scalding water, and the cove 35 is placed in position and secured, after which the live steam is admitted into the vessel and the steam-space 4, thereby cooking the cereal. After the cereal is properly cooked the steam is shut off, the cover 35 removed, and the pipe 31 opened, so as to draw off the cooked cereal into the cans, jars, or packages, which latter are sealed after being filled and are then ready to be placed upon the market.

Having thus described the invention, what is claimed as new is—

1. The herein-described process of treating cereals, which consists of subjecting the cereal to be treated to the action of a lye bath and steam and then agitating the mass and at the same time subjecting it to a stream of scalding water, substantially as and for the purpose set forth.

2. The herein-described method of treating cereals, consisting of subjecting the cereal to be treated to a bath of lye and simultaneously applying steam, then agitating the mass in the presence of a flowing stream of scalding water, and lastly inclosing the mass so as to shut off atmospheric influences and applying heat to cook the cereal, substantially as and for the purpose set forth.

3. The herein-described method of preparing cereals, which consists in subjecting the cereal to be treated in a vessel to the combined action of a lye bath and steam, then simultaneously agitating and running a stream of scalding water upon the mass without removing it from the said vessel, whereby the loosened hulls and all traces of the lye bath are removed, finally inclosing the cereal in the said vessel and subjecting it to the action of steam, whereby it is cooked, substantially as specified.

4. In an apparatus for treating cereals, the combination of a vessel or caldron comprising an inner and an outer shell inclosing a steam-space, a receptacle supported within the upper portion of the caldron and having a perforate bottom, a valved pipe extending through the lower portion of the caldron and communicating with the said perforate bottom, an agitator operating within the receptacle immediately above its perforate bottom, a steam-pipe having communication with the steam-space of the caldron and with the inner shell thereof, exhaust-pipes communicating with the upper portion of the inner receptacle and with the bottom portion of the said steam-space, and a waste-pipe making connection with the bottom portion of the inner shell of the caldron, substantially as set forth.

5. The herein-described apparatus for treating cereals, consisting of a vessel or caldron comprising an inner and an outer shell inclosing a steam-space, a steam-pipe communicating with the said steam-space and the interior of the vessel, steam-exhaust pipes leading into the steam-space and the upper portion of the vessel, an inner receptacle supported within the upper portion of the vessel and having a perforate bottom, a valved pipe communicating with the said perforate bottom, a waste-pipe having communication with the bottom portion of the vessel, an agitator arranged to operate immediately above the said perforate bottom, means for supplying the cereal and hot water to the vessel, and a cover adapted to be positively secured to the open end of the vessel and provided with a heat-indicator, substantially as and for the purpose set forth.

In testimony that I claim the foregoing as my own I have hereto affixed my signature in the presence of two witnesses.

KIRK HOPKINS.

Witnesses:
JOHN H. SIGGERS,
GEO. C. SHOEMAKER.